United States Patent [19]

Inoue et al.

[11] Patent Number: 5,081,971
[45] Date of Patent: Jan. 21, 1992

[54] INTAKE SYSTEM FOR INTERNAL COMBUSTION ENGINE

[75] Inventors: Kazuo Inoue; Yoshio Ajiki; Hiroshi Sono, all of Saitama, Japan

[73] Assignee: Honda Giken Kogyo Kabushiki Kaisha, Tokyo, Japan

[21] Appl. No.: 505,930

[22] Filed: Apr. 6, 1990

[30] Foreign Application Priority Data

Apr. 7, 1989 [JP] Japan .................................. 1-89252
Apr. 7, 1989 [JP] Japan .................................. 1-89254

[51] Int. Cl.⁵ .............................................. F02B 31/00
[52] U.S. Cl. ..................................... 123/308; 123/432
[58] Field of Search ................... 123/90.16, 432, 308

[56] References Cited

U.S. PATENT DOCUMENTS

| | | | |
|---|---|---|---|
| 4,285,310 | 8/1981 | Takizawa et al. | 123/432 |
| 4,442,806 | 4/1984 | Matsuura et al. | 123/90.16 |
| 4,480,617 | 11/1984 | Nakano | 123/90.16 |
| 4,519,350 | 5/1985 | Oda et al. | 123/432 |
| 4,523,550 | 8/1985 | Matsuura | 123/90.16 |
| 4,537,165 | 8/1985 | Honda et al. | 123/432 |
| 4,545,342 | 10/1985 | Nakano et al. | 123/90.16 |
| 4,587,936 | 5/1986 | Matsuura et al. | 123/432 |

FOREIGN PATENT DOCUMENTS

| | | |
|---|---|---|
| 0213758 | 3/1987 | European Pat. Off. . |
| 0258061 | 3/1988 | European Pat. Off. . |
| 0265191 | 4/1988 | European Pat. Off. . |
| 2853576 | 7/1979 | Fed. Rep. of Germany ...... 123/308 |
| 0150423 | 8/1985 | Japan .................................. 123/308 |
| 86/00081 | 9/1986 | World Int. Prop. O. . |

Primary Examiner—David A. Okonsky
Attorney, Agent, or Firm—Lyon & Lyon

[57] ABSTRACT

An intake system of an internal combustion engine includes first and second intake valve openings provided in the engine body and exposed to a combustion chamber, first and second intake valves in the engine body for opening and closing the valve openings, respectively, and a valve operating system connected to the intake valves for changing the modes of operation of the valves in compliance with the operation of the engine, wherein the engine body is provided with a swirl producing intake port leading to the first intake valve opening and a substantially linear main intake port leading to the second intake valve opening, and wherein the valve operating system is capable of changing over between a state meeting a low speed operation of the engine in which the first intake valve is operated in a mode corresponding to the low speed operation and the second intake valve is in a resting or substantially resting condition, and a state meeting at least a part of operational ranges of the engine other than the low speed operation in which the valves are operated in a mode corresponding to a high speed operation of the engine.

10 Claims, 9 Drawing Sheets

INTAKE SYSTEM FOR INTERNAL COMBUSTION ENGINE

BACKGROUND OF THE INVENTION

1. Field of the Invention

The field of the invention is an intake system of an internal combustion engine, which has first and second intake valve openings provided in an engine body so as to be exposed to a combustion chamber, first and second intake valves disposed in the engine body and capable of opening and closing the first and second intake valve openings, respectively, and a valve operating system connected to said first and second intake valves and capable of changing operational modes of the valves in compliance with the operational condition of the engine.

2. Description of the Prior Art

Intake systems of the above mentioned type are known, for example, from Japanese Patent Application Laid-open No. 252832/86 and the like.

In such a conventional system, when an engine is operating at a low speed, both the intake valves are operated in a mode corresponding to the low speed operation of the engine and the area of intake passage is reduced by a swirl control valve to provide a swirl effect for reducing the fuel consumption. On the other hand, at the time of a high speed operation of the engine, both the intake valves are operated in a mode corresponding to the high speed operation of the engine and the area of the intake passage is increased by the swirl control valve so as to improve the charging efficiency and thereby enhance the output performance of the engine.

In such an intake system, it is arranged that an intake port leading to one of the intake valve openings is closed by the swirl control valve in the low speed operation of the engine thereby to admit an air-fuel mixture into the combustion chamber only through the other intake valve opening so as to provide the swirl effect. In this arrangement, however, the intake valve which is capable of opening and closing the one of the intake valve openings continues its opening and closing actions in a mode corresponding to the low speed operation of the engine and opening and closing of the one intake valve opening leading to the combustion chamber may undesirably disorder the swirl in the combustion chamber. Further, in that case, since the one of the intake valves which has substantially nothing to do with controlling intake of the air-fuel mixture to the combustion chamber during the low speed operation is still operated for opening and closing actions, additional driving force is required for obtaining such actions. Furthermore, in the conventional system, it is necessary to dispose the swirl control valve in the intake port, and provision of such a valve increases the intake resistance at the time of high speed operation of the engine, and this could be a factor of disturbing the improvement in the engine output performance.

SUMMARY OF THE INVENTION

The present invention has been proposed in view of the above mentioned circumstances and it is an object of the present invention to provide an intake system of an internal combustion engine wherein the driving force required for the system can be reduced while preventing the swirl generation in the combustion chamber from being disadvantageously affected thereby at the time of low speed operation of the engine, and wherein the intake resistance can be reduced in operational ranges except for the low speed operation of the engine.

In order to achieve the above object, according to the present invention, there is proposed an intake system of an internal combustion engine, comprising first and second intake valve openings provided in a body of the engine so as to be exposed to a combustion chamber, first and second intake valves disposed in the engine body and capable of opening and closing said first and second intake valve openings, respectively, and a valve operating device connected to said first and second intake valves and capable of changing modes of operation of the valves in compliance with an operational condition of the engine, wherein said engine body is provided with a swirl producing intake port leading to the first intake valve opening and a substantially linear main intake port leading to the second intake valve opening, and wherein said valve operating system is arranged to be capable of changing over between a first state meeting a low speed operation of the engine in which the first intake valve is operated in a mode corresponding to the low speed operation of the engine and the second intake valve is in a resting or a substantially resting condition, and a second state meeting at least a part of operational ranges of the engine other than said low speed operation in which the first and second intake valves are operated in a mode corresponding to a high speed operation of the engine.

Owing to the above arrangement, the second intake valve is brought into a resting or substantially resting condition at the time of the low speed operation of the engine, and the first intake valve is opened and closed in an operational mode corresponding to the low speed operation of the engine. Therefore, the air-fuel mixture is spirally introduced into the combustion engine at a relatively high speed from the swirl producing intake port via the first intake valve opening, which is not disadvantageously affected by the second intake valve which is then in a substantially resting condition. The driving force for operating the second intake valve is not required in this state. Further, in at least a part of operational ranges of the engine except for the low speed operation area, the first and second intake valves are operated for opening and closing actions in an operational mode corresponding to a high speed operation of the engine and hence a relatively large amount of air-fuel mixture is introduced into the combustion chamber from the main intake port and the swirl producing intake port via the first and second intake valve openings. Thus, there is nothing in each of the ports to increase the intake resistance.

The above and other objects, features and advantages of the present invention will become apparent from a reading of the following description of the preferred embodiments, taken in conjunction with the accompanying drawings.

BRIEF DESCRIPTION OF THE DRAWINGS

FIGS. 1 to 5 illustrate a first embodiment of the present invention, wherein

FIG. 1 is a longitudinal sectional view of an essential portion of an internal combustion engine;

FIG. 2 is a view seen in the direction of the line II—II of FIG. 1;

FIG. 3 is a sectional view taken along the line III—III of FIG. 1;

FIG. 4 is a sectional view taken along the line IV—IV of FIG. 3; and

FIG. 5 is a diagram showing an amount of lift and opening and closing timings of an intake valve and an exhaust valve.

FIGS. 6 to 9 illustrate another embodiment of the invention, wherein

FIG. 6 is a longitudinal sectional view of an essential portion of an internal combustion engine similar to FIG. 1;

FIG. 7 is a sectional view taken along the line VII—VII of FIG. 6;

FIG. 8 is a sectional view taken along the line VIII—VIII of FIG. 7; and

FIG. 9 is a diagram showing an output characteristic.

DESCRIPTION OF THE PREFERRED EMBODIMENTS

The present invention will now be described by way of embodiments with reference to the accompanying drawings.

Figure 1:
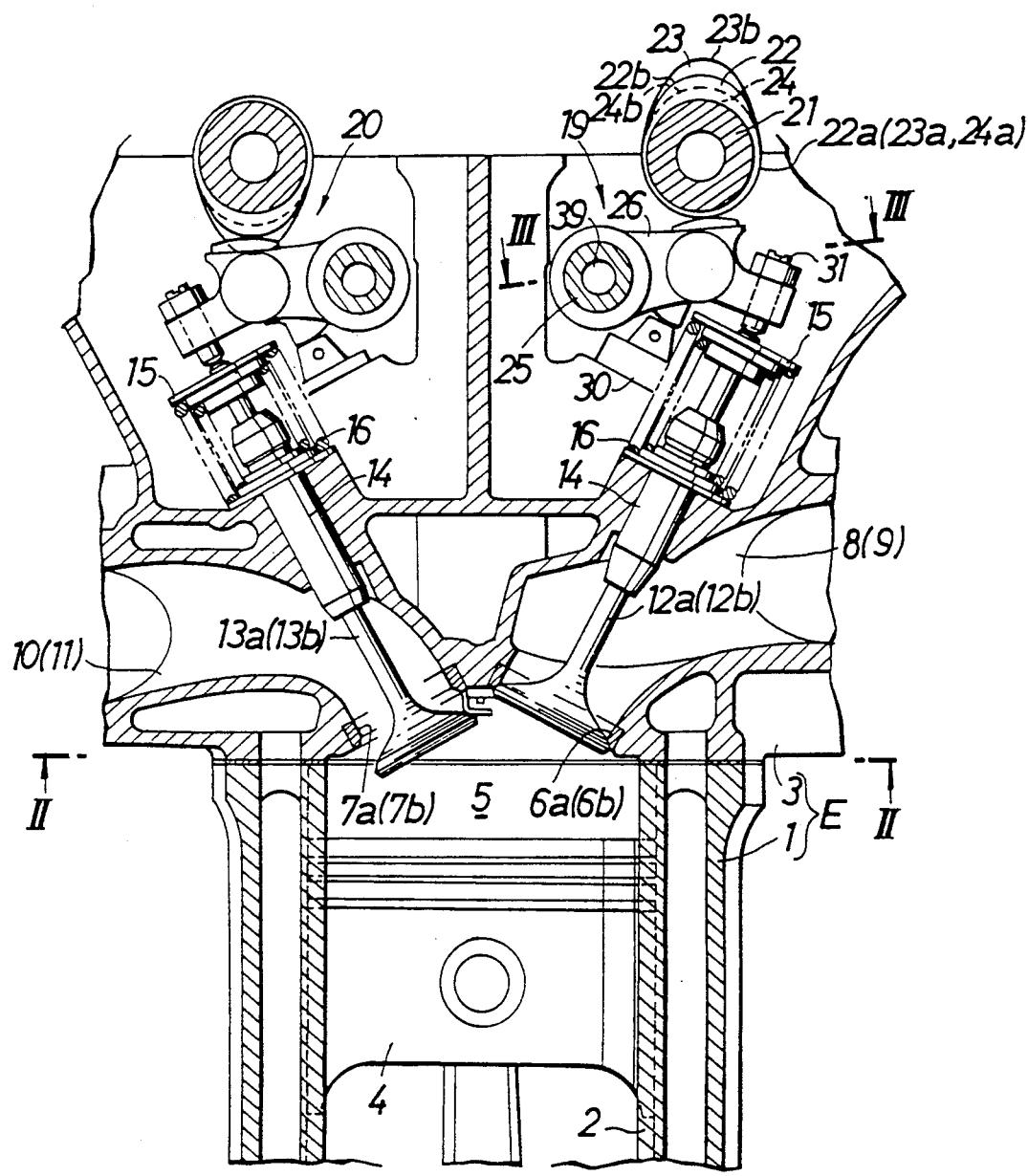
Figure 2:
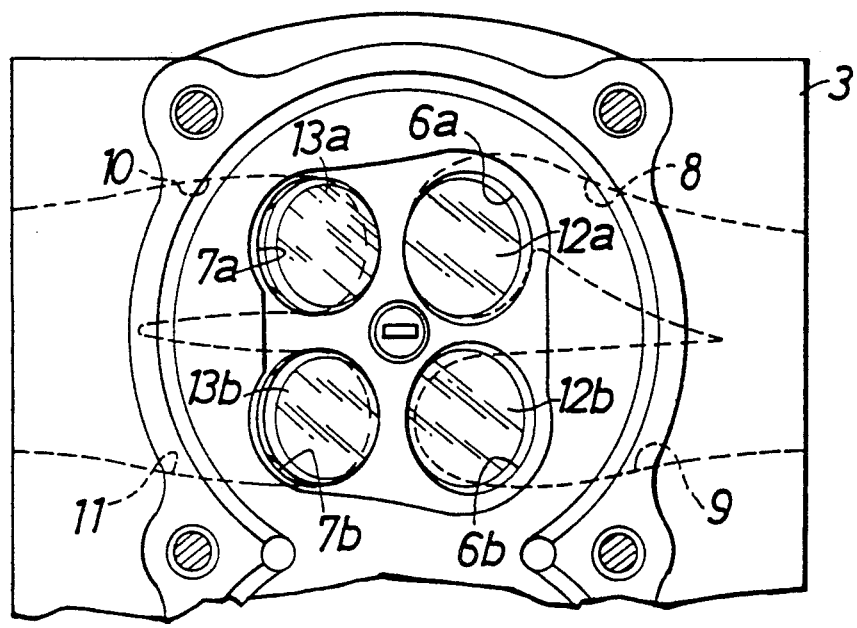

A first embodiment according to the present invention will first be described. Referring to FIGS. 1 and 2, a DOHC multi-cylinder type internal combustion engine to be mounted on a vehicle is shown to have in a cylinder block 1 a plurality of cylinders 2 which are arranged straightforwardly. A body E of the engine comprises a cylinder head 3 jointed to the upper end of the cylinder block 1, a piston 4 slidably fitted into each of the ,cylinders 2, and a combustion chamber 5 defined between each piston 4 and the cylinder head 3. At each of those portions of the cylinder head 3 which form ceiling surfaces of the respective combustion chambers 5, first and second intake valve openings 6a and 6b as well as first and second exhaust valve openings 7a and 7b are provided. On the other hand, the cylinder head 3 is provided with a swirl producing intake port 8 and a main intake port 9 which have a common open end opened to one side surface of the cylinder head 3. The swirl producing intake port 8 is spirally or helically formed and is connected to the first intake valve opening 6a, whereas the main intake port 9 is substantially linearly extended and connected to the second intake valve opening 6b. The first and second exhaust valve openings 7a and 7b are connected to substantially linearly extended exhaust ports 10 and 11, respectively, and both the exhaust ports 10 and 11 have a common opening at the other side surface of the cylinder head 3.

Two pairs of guide sleeves 14 . . . are securely fitted in place on the cylinder head 3 at portions thereof corresponding to each of the cylinders 2 for guiding first and second intake valves 12a and 12b capable of opening and closing the first and second intake valve openings 6a and 6b, respectively, and for guiding first and second exhaust valves 13a and 13b capable of opening and closing the first and second exhaust valve opening 7a and 7b, respectively. The intake valves 12a and 12b as well as the exhaust valves 13a and 13b have upper ends projected upwardly from the respective guide sleeves 14, and flange portions 15 are disposed on the upper ends of the valves. Valve springs 16 are mounted under compression between the flange portions 15 and the cylinder head 3, and these springs serve to urge the respective intake valves 12a, 12b and exhaust valves 13a and 13b in an upward or valve-closing direction.

An intake valve side valve operating system 19 is connected to each of the intake valves 12a and 12b, and an exhaust valve side valve operating system 20 is connected to each of the exhaust valves 13a and 13b, so that the valves 12a, 12b, 13a and 13b are operated in their respective operational modes which comply with the operational state of the engine.

Figure 3:
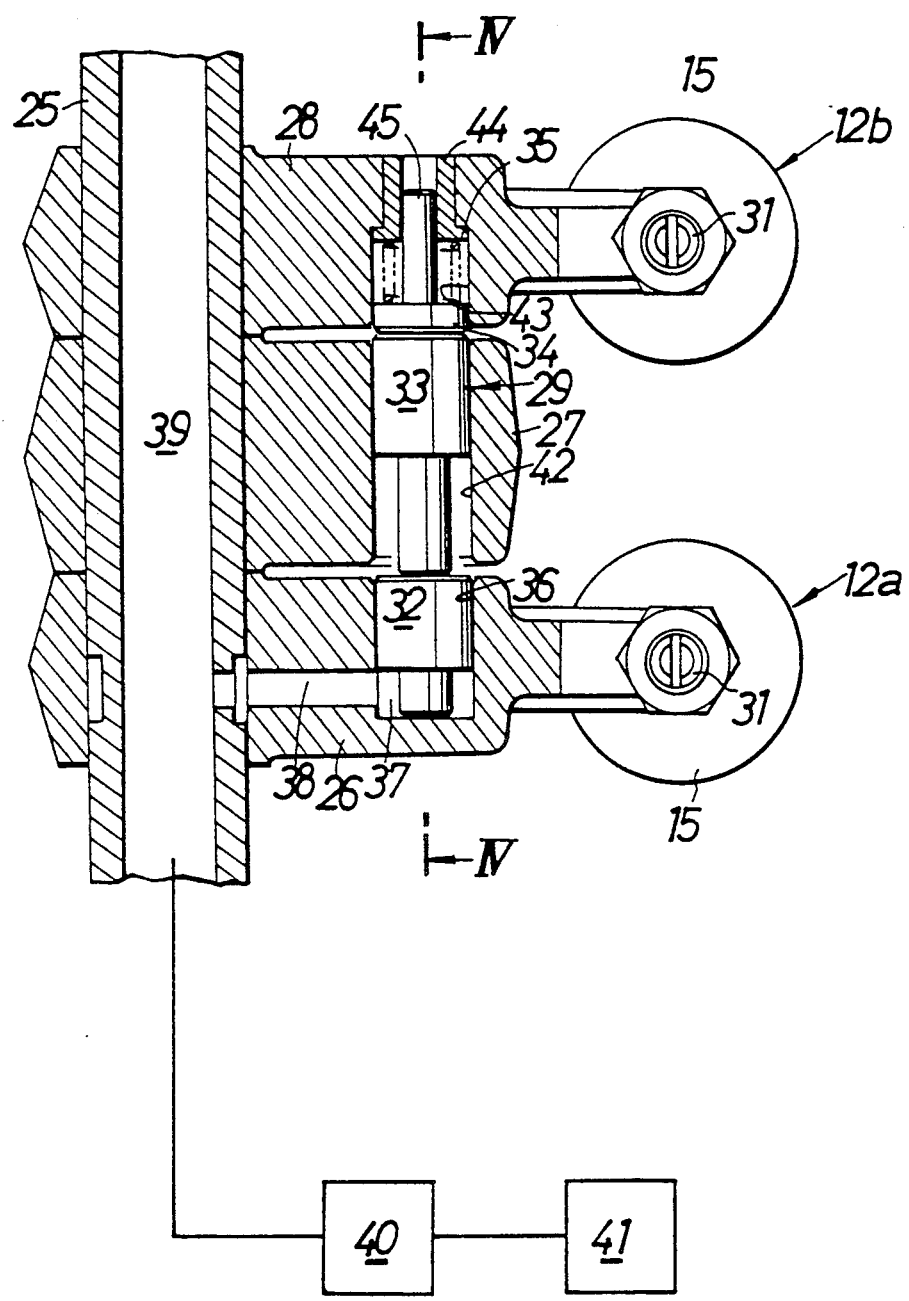
Figure 4:
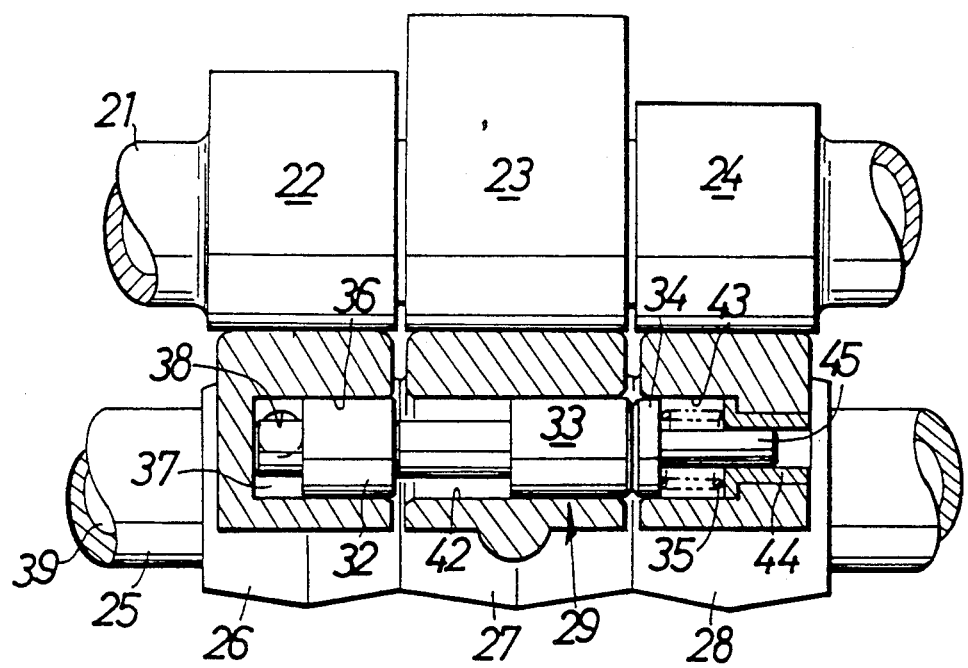

Referring also to FIGS. 3 and 4, the intake valve side valve operating system 19 comprises a cam shaft 21 which is driven for rotation at a reduction ratio of ½ from a crankshaft (not shown) of the engine; a low speed cam 22, a high speed cam 23 and a resting cam 24 all mounted to the cam shaft 21; a rocker shaft 25 securely disposed in parallel to the cam shaft 21; a first drive rocker arm 26, a free rocker arm 27 and a second drive rocker arm 28 all pivotably supported on the rocker shaft 25; and a hydraulically operated connection changeover means 29 provided between the rocker arms 26, 27 and 28.

The cam shaft 21 is integrally provided with the low speed cam 22 at a position corresponding to the first intake valve 12a, the resting cam 24 at a position corresponding to the second intake valve 12b, and the high speed cam 23 at a position between both the cams 22 and 24. The low speed cam 22 has a shape meeting a low speed operation of the engine and comprises a circular base portion 22a and a lobe portion 22b which is radially outwardly projected from the circular base portion 22a. The high speed cam 23 has a shape that meets a high speed operation of the engine and comprises a circular base portion 23a and a lobe portion 23b which is projected from the circular base portion 23a with its projected amount and central angular range being set greater than those of the lobe portion 22b of the low speed cam 22. Further, the resting cam 24 comprises a circular base portion 24a and a lobe portion 24b which is slightly projected radially outwardly from the circular base portion 24a. In particular, the lobe portion 24b is projected from the circular base portion 24a at a position corresponding to the lobe portion 22b of the low speed cam 22 and the lobe portion 23b of the high speed cam 23, and the projected amount and the central angular range of this lobe portion 24b is set to such an extent as causing the second intake valve 12b to slightly open and therefore to be judged in a substantially resting state.

On the other hand, the rocker shaft 25 is fixedly held on the cylinder head 3 below the cam shaft 21 with the axis of the shaft 25 being in parallel to the cam shaft 21. On this rocker shaft 25 are pivoted the first drive rocker arm 26 which is operatively connected to the first intake valve 12a, the second drive rocker arm 28 operatively connected to the second intake valve 12b and the free rocker arm 27 disposed between the first and second drive rocker arms 26 and 28, those rocker arms 26, 27 and 28 being disposed adjacent to one another.

A tappet screw 31 is threadedly engaged in each of the first and second drive rocker arms 26 and 28 for advanced and retracted movements relative thereto and these tappet screws 31 are placed in abutment against the stem ends of the corresponding intake valves 12a and 12b. Thus, both the intake valves 12a and 12b are operated in response to the swinging movements of both the drive rocker arms 26 and 28.

The free rocker arm 27 is resiliently urged by a resiliently urging means 30 (see FIG. 1) interposed between the arm 27 and the cylinder head 3 in a direction coming into slide contact with the high speed cam 23.

The hydraulically operated connection changeover means 29 comprises a first changeover pin 32 capable of connecting the first drive rocker arm 26 and the free rocker arm 27 together, a second changeover pin 33 capable of connecting the free rocker arm 27 and the second drive rocker arm 28 together, a regulating member 34 for regulating shifting movements of the first and second changeover pins 32 and 33, and a return spring 54 for urging the pins 32 and 33 and the regulating member 34 toward the side releasing the connection between the rocker arms.

The first drive rocker arm 26 is provided with a bottomed, first guide bore 36 which opens toward the free rocker arm 27 and is extended parallel to the rocker shaft 25. The cylindrical first changeover pin 32 is slidably fitted into the first guide bore 36 to define a hydraulic pressure chamber 37 between one end of the first changeover pin 32 and a closed end of the first guide bore 36. The first drive rocker arm 26 is further provided with a passage 38 communicating with the hydraulic pressure chamber 37, and the rocker shaft 25 is bored with a hydraulic fluid supply passage 39. The passage 39 is always in communication with the hydraulic pressure chamber 37 via the passage 38 irrespective of the swung position of the first drive rocker arm 26. Further, the hydraulic fluid supply passage 39 is connected to a hydraulic pressure supply source 41 via a control valve 40 which is capable of permitting flow of the hydraulic pressure from the hydraulic pressure supply source 41, at a high pressure level or a low pressure level in a switched manner, to the hydraulic fluid supply passage 39, i.e., to the hydraulic pressure chamber 37.

The free rocker arm 27 is provided with a guide bore 42 extended in alignment with the first guide bore 36 and in parallel to the rocker shaft 25 over opposite side surfaces of the free rocker arm 27. The second, changeover pin 33 is slidably fitted in the guide bore 42 with one end of the pin 33 being abutted against the other end of the first changeover pin 32.

The second drive rocker arm 28 is provided with a bottomed, second guide bore 43 which is extended in alignment with the guide bore 42 and in parallel to the rocker shaft 25 and opens toward the free rocker arm 27. Slidably fitted in the second guide bore 43 is the disk like regulating member 34 which abuts against the other end of the second changeover pin 33. A cylindrical guide member 44 is inserted and fixed in the closed end of the second guide bore 43, and a rod 45 slidably inserted in the guide member 44 is coaxially and integrally provided with the regulating member 34. The return spring 35 is interposed under compression between the closed end of the second guide bore 43 and the regulating member 34, and the mutually abutted pins 32, 33 and regulating member 34 are urged by the spring force of the return spring 35 toward the hydraulic pressure chamber 37. In the hydraulic connection changeover means 29 thus constructed, when the hydraulic pressure in the hydraulic pressure chamber 37 rises to a high level, the first changeover pin 32 moves into the guide bore 42 and the second changeover pin 33 moves into the second guide bore 43 thereby connecting the rocker arms 26, 27 and 28 together. On the other hand, when the hydraulic pressure in the hydraulic pressure chamber 37 is reduced, the first changeover pin 32 returns with the aid of the force of the return spring 35 to a position at which the end surface of the pin 32 abutting against the second changeover pin 33 is located between the first rocker arm 26 and the free rocker arm 27 and the second changeover pin 33 returns to a position where the end surface of the pin 33 abutting against the regulating member 34 is located between the free rocker arm 27 and the second drive rocker arm 28. As a result, the connection between the rocker arms 26, 27 and 28 is released.

Figure 5:
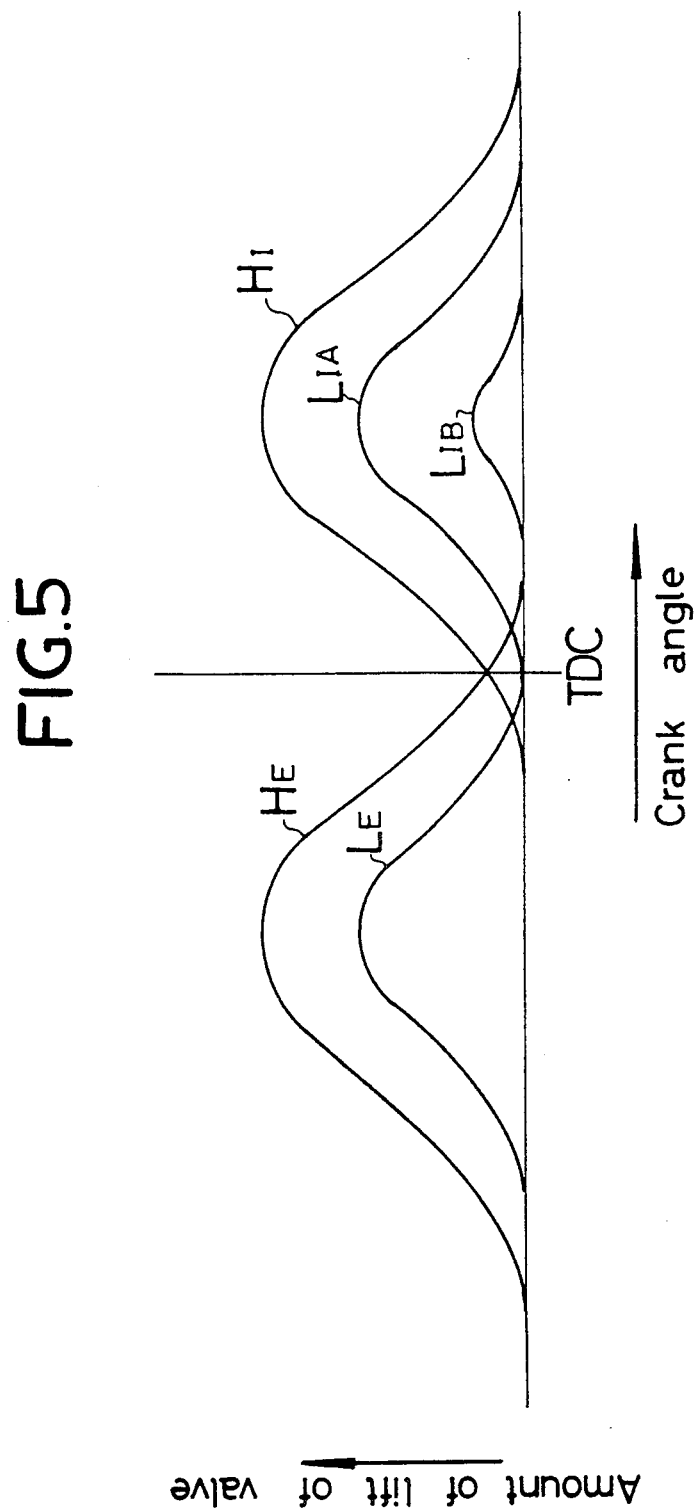

Therefore, in the intake valve side valve operating system 19, when the hydraulically operated connection changeover means 29 is brought into a connection released condition, the first intake valve 12a is operated for opening and closing actions in a mode corresponding to the shape of the low speed cam 22 as shown by a curve $L_{IA}$ in FIG. 5, and the second intake valve 12b is operated in a mode corresponding to the shape of the resting cam 24, i.e., to such an extent that the valve 12b assumes a substantially resting state at the position corresponding to the lobe portion 24b of the resting cam 24 as shown by a curve $L_{IB}$ in FIG. 5. And when the hydraulically operated connection changeover means 29 is brought into a connected condition, the first and second intake valves 12a and 12b are operated for opening and closing actions in compliance with the shape of the high speed cam 23 as shown by a curve $H_I$ in FIG. 5.

The exhaust valve side valve operating system 20 basically has the same construction as that of the intake valve side valve operating system 19, however, a low speed cam is used in place of the resting cam. Therefore, in a connection released condition, both the exhaust valves 13a and 13b are operated for opening and closing actions in compliance with the shape of the low speed cam as shown by a curve $L_E$ in FIG. 5, and in a connected condition, both the exhaust valves 13a and 13b are opened and closed in compliance with the shape of the high speed cam as shown by a curve $H_E$ in FIG. 5.

The operation of this illustrated embodiment will be described hereinafter. At the time of the low speed operation of the engine, the hydraulic pressure of the hydraulic pressure chamber 37 in the hydraulically operated connection changeover means 29 is set at a low level. In this state, the intake valve side valve operating system 19 holds the second intake valve 12b in a substantially resting condition and causes the first intake valve 12a to be operated for opening and closing actions in compliance with the shape of the low speed cam 22 in a mode corresponding to the low speed operation of the engine. Thereby, at the time of opening of the first intake valve 12a, the air-fuel mixture is sucked at a relatively high speed from the swirl producing intake port 8 to the combustion chamber 5 via the first intake valve opening 6a. Further, since the swirl producing intake port 8 is formed into a spiral shape and is connected to the first intake valve opening 6a, the air-fuel mixture is spirally introduced to the combustion chamber 5 at a relatively high speed whereby a strong swirl is formed in the combustion chamber 5. Therefore, the combustibility in a fuel thin condition at the time of low speed operation of the engine can be improved and the fuel consumption can be reduced.

Further, since the second intake valve 12b is in a substantially resting condition, there is no bad influence to be exerted upon the swirl generation in the combustion chamber 5 and increase in the driving force required for the valve opening and closing operation can be avoided.

It should be noted that the second intake valve 12b is designed to slightly open by the lobe portion 24b of the resting cam 24 at the time of opening of the first intake valve 12a. This design serves to prevent fuel from staying in the main intake port 9 which would otherwise occur if the second intake valve 12b is stopped in its full closed state. More specifically, if the fuel stays in the main intake port 9, such fuel will flow at once into the combustion chamber 5 when the second intake valve 12b is brought to an open state in response to the engine entering a high speed operation, leading to generation of smoke and abnormal combustion. However, such fuel stay in the main intake port 9 can be prevented by slightly opening the second intake valve 12b. Further, if the valve 12b is held in a completely resting condition, there is a fear that the valve 12b may stick to the seat portion of the second intake valve opening 6b and that lubrication of operational parts may be deteriorated. However, such fear can be eliminated by the above arrangement of the valve 12b.

At the time of high speed operation of the engine, a high hydraulic pressure is supplied to the hydraulic pressure chamber 37 of the hydraulically operated connection changeover means 29 by the control valve 40, and the rocker arms 26, 27 and 28 of the intake valve side valve operating system 19 are integrally connected together. Consequently, both the intake valves 12a and 12b are operated for opening and closing actions in compliance with the shape of the high speed cam 23 and the charging efficiency to the combustion chamber 5 is improved, leading to an increase in the revolution and output performances of the engine.

Further, since there is nothing present in the swirl producing intake port 8 and the main intake port 9 that increases the intake resistance, the charging efficiency can be improved as compared with that of the conventional arrangement and the engine output can be enhanced.

FIGS. 6–9 illustrate another embodiment of the present invention, wherein portions corresponding to those in the previous embodiment as shown in FIGS. 1–5 are designated by the same reference numerals and characters.

Figure 6:
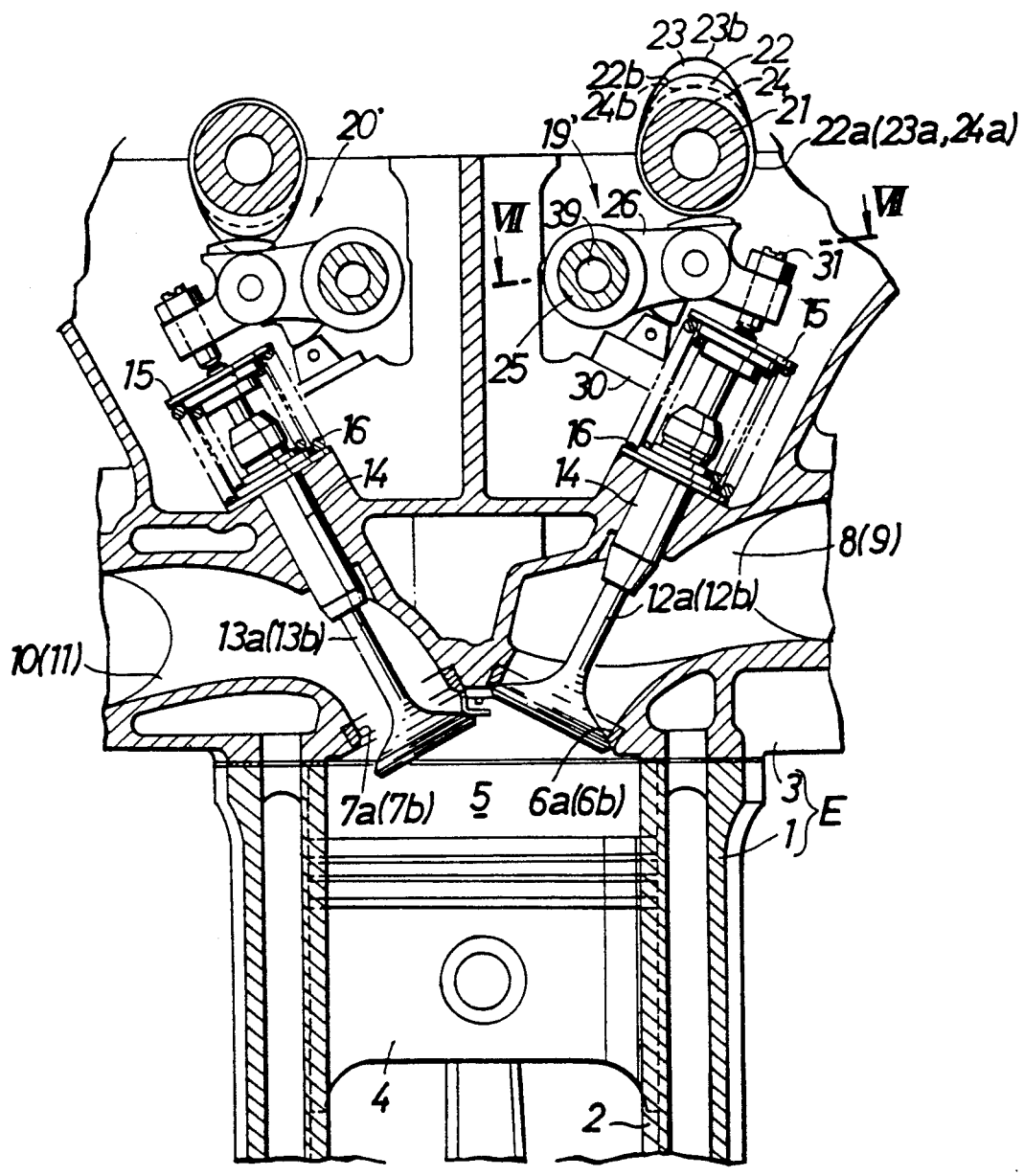
Figure 7:
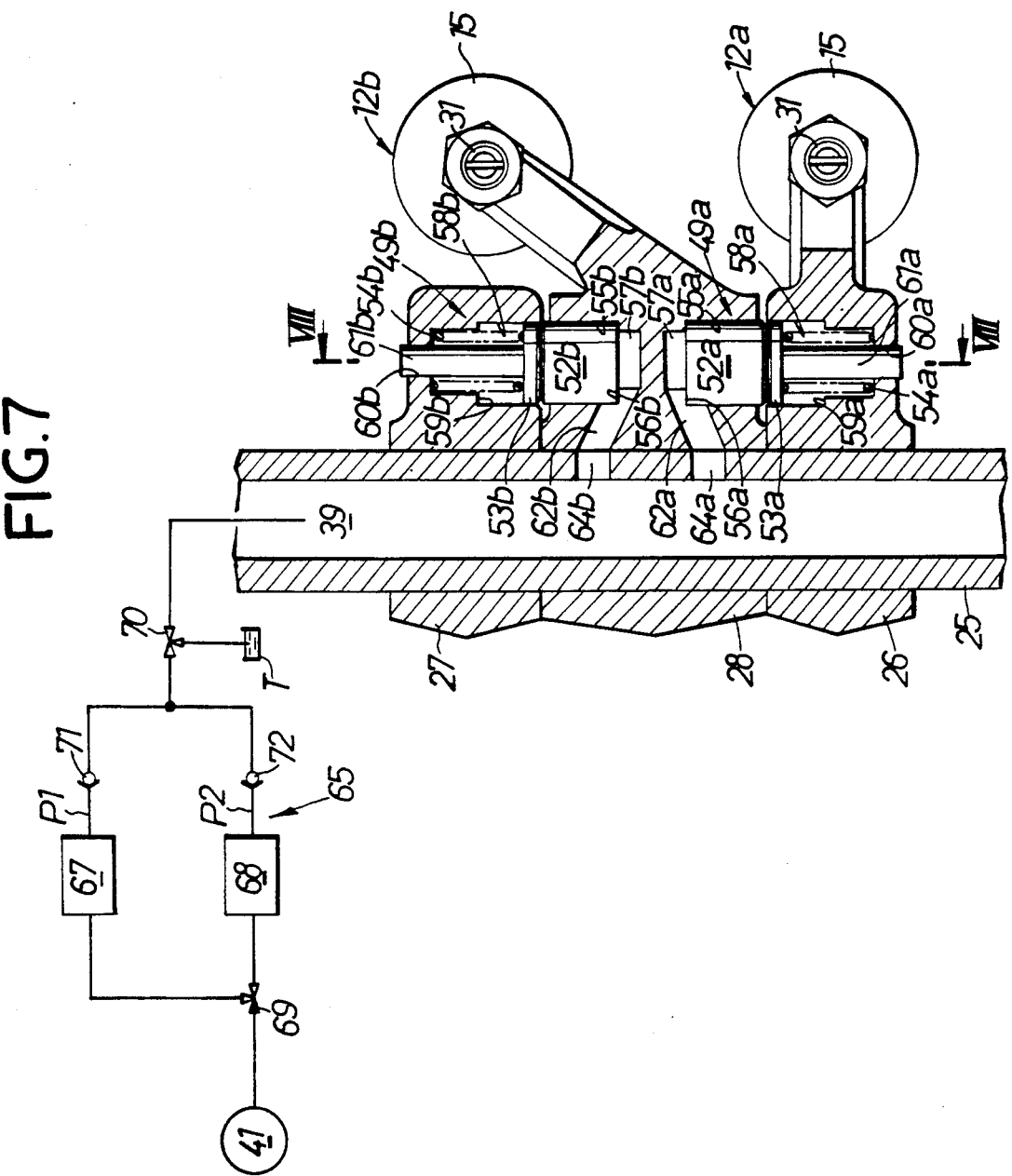
Figure 8:
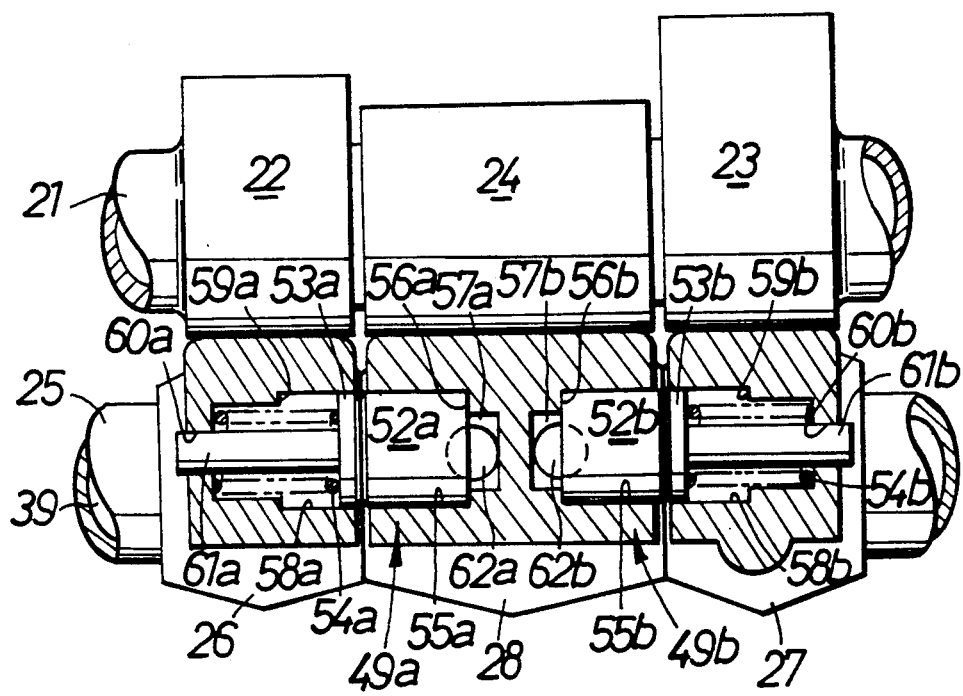

Referring to FIGS. 6, 7 and 8, an intake valve side valve operating system 19' is connected to each of the intake valves 12a and 12b, and an exhaust valve side valve operating system 20' is connected to each of the exhaust valves 13a and 13b, so that the valves 12a, 12b, 13a and 13b are operated in their respective modes corresponding to the operational condition of the engine.

The intake valve side valve operating system 19' comprises the cam shaft 21; the low speed cam 22, the high speed cam 23 and the resting cam 24 which are disposed on the cam shaft 21; the rocker shaft 25 securely disposed in parallel to the cam shaft 21; the first drive rocker arm 26, the second drive rocker arm 28 and the free rocker arm 27 which are pivotably supported on the rocker shaft 25; a first hydraulically operated connection changeover means 49a disposed between the first and second drive rocker arms 26 and 28; and a second hydraulically operated connection changeover means 49b disposed between the second drive rocker arm 28 and the free rocker arm 27.

Pivoted on the rocker shaft 25 are the first drive rocker arm 26 operatively connected to the first intake valve 12a, the second drive rocker arm 28 operatively connected to the second intake valve 12b and disposed adjacent to the first drive rocker arm 26, and the free rocker arm 27 disposed on the side of the second drive rocker arm 28 opposite to the first drive rocker arm 26.

Integrally formed with the cam shaft 21 are the low speed cam 22 at a position where it slidably contacts the first drive rocker arm 26, the resting cam 24 at a position where it slidably contacts the second drive rocker arm 28, and the high speed cam 23 at a position where it slidably contacts the free rocker arm 27.

Both the first and second hydraulically operated connection changeover means 49a and 49b basically have the same structure so that only the first connection changeover means 49a will be described in detail below with affix "a" being attached to reference numerals of associated elements thereof, and the second connection changeover means 49b will be illustrated only and its detailed description will be omitted here.

The first connection changeover means 49a comprises a changeover pin 52a shiftable between a position connecting the first and second drive rocker arms 26 and 28 and a position releasing such connection, a regulating member 53a for regulating the shifting movement of the changeover pin 52a, and a return spring 54a for urging the regulating member 53a toward the side releasing the connection.

The second drive rocker arm 28 is provided with a bottomed guide bore 55a which opens toward the first drive rocker arm 26 and is extended parallel to the rocker shaft 25. The guide bore 55a is provided at a portion closer to a closed end thereof with a small diameter portion via a step portion 56a. The changeover pin 52a is slidably fitted in the guide bore 55a, and a hydraulic pressure chamber 57a is defined between the changeover pin 52a and the closed end of the guide bore 55a.

The first drive rocker arm 26 is provided with a bottomed guide bore 58a which opens toward the second drive rocker arm 28 and is extended in alignment with the guide bore 55a in parallel to the rocker shaft 25. The disk like regulating member 53a is slidably fitted into the guide bore 58a. The guide bore 58a is provided at a portion closer to a closed end thereof with a small diameter portion via a regulating step portion 59a, and is coaxially provided at the closed end with an insertion bore 60a. Further, the regulating member 53a is coaxially and integrally provided with a rod 61a which is shiftably inserted in the insertion bore 60a. Moreover, a return spring 54a surrounding the rod 61a is mounted under compression between the regulating member 53a and the closed end of the guide bore 58a.

The axial length of the changeover pin 52a is set such that when one end thereof abuts against the step portion 56a, the other end is located between the first and second drive rocker arms 26 and 28, whereas when the pin 52a is moved into the guide bore 58a until the regulating member 53a abuts against the regulating step portion 59a, said one end of the changeover pin 53a remains in the guide bore 55a.

The second drive rocker arm 28 is bored with a hydraulic fluid passage 62a communicating with the hydraulic chamber 57a, and the rocker shaft 25 is bored with a communicating bore 64a which establishes communication between the passage 62a and the hydraulic fluid supply passage 39 in the rocker shaft 25 irrespective of the swinging movement of the second drive rocker arm 28.

In the first connection changeover means 49a, the first and second drive rocker arms 26 and 28 are connected with each other by the movement of the changeover pin 52a which is effected against the spring force of the return spring 54a by the hydraulic pressure supplied to the hydraulic pressure chamber 57a in such an amount that is required only to move the changeover pin 52a.

In the second connection changeover means 49b, the second drive rocker arm 28 and the free rocker arm 27 are connected with each other by the movement of the changeover pin 52b which is performed against the spring force of the return spring 54b by supply of the hydraulic pressure to the hydraulic pressure chamber 57b in such an amount that is required only to move the changeover pin 52b.

Set loads of the return springs 54a and 54b in the first and second connection changeover means 49a and 49b are determined differently from each other, and for instance, the set load of the return spring 54a is determined smaller than that of the return spring 54b.

The hydraulic pressure supply source 41 is connected to the hydraulic fluid supply passage 39 via a hydraulic pressure control means 65. The control means 65 comprises a pair of regulators 67 and 68; a changeover valve 69 for alternatively connecting the regulator 67 or 68 with the hydraulic pressure supply source 41; and a changeover valve 70 capable of changing over between a state in which the hydraulic fluid supply passage 39 is released to a hydraulic fluid tank T and a state in which the passage 39 is connected to the regulators 67 and 68. Check valves 71 and 72 are interposed between the changeover valve 70 and the regulators 67 and 68, respectively.

One 67 of the regulators is constructed to control the hydraulic pressure fed from the hydraulic pressure supply source 41 and output it as a relatively low hydraulic pressure P1. The hydraulic pressure P1 is set at such a level that is large enough to move the changeover pin 52a against the spring force of the return spring 54a when the pressure P1 acts in the hydraulic pressure chamber 57a of the first connection changeover means 49a, but smaller than the spring force of the return spring 54b of the second connection changeover means 49b. On the other hand, the other regulator 68 is constructed to control the hydraulic pressure from the hydraulic pressure supply source 41 and output it as a relatively high hydraulic pressure P2. The hydraulic pressure P2 is set at such a level large enough to exhibit a force moving both the changeover pins 52a and 52b against the spring force of the return springs 54a and 54b when the pressure P2 acts in the hydraulic pressure chambers 57a and 57b.

The exhaust valve side valve operating system 20' is arranged to have basically the same structure as that of the intake valve side valve operating system 19'.

Next, the operation of this embodiment will be described below. During a low speed operation of the engine, the hydraulic pressure in the hydraulic fluid supply passage 39 is released to the outside by the changeover valve 70, thereby bringing the first and second connection changeover means 49a and 49b into a connection released condition. In this condition, the intake valve side valve operating system 19' operates to cause the first intake valve 12a to be opened and closed by the first drive rocker arm 26 which is driven for swinging movement by the low speed cam 22, and also cause the second intake valve 12b to be operated by the second drive rocker arm 28 which is in slide contact with the resting cam 24. The resting cam 24 keeps the second intake valve 12b in a substantially resting condition, while the first intake valve 12a is opened and closed in compliance with the shape of the low speed cam 22 in a mode corresponding to the low speed operation of the engine. Therefore, at the time of opening of the first intake valve 12a, the air-fuel mixture is sucked into the combustion chamber 5 at a relatively high speed from the spiral-shaped swirl producing intake port 8 via the first intake valve opening 6a, resulting in the formation of a strong swirl in the combustion chamber 5. Therefore, the combustibility in a fuel thin condition at the time of low speed operation of the engine can be improved and the fuel consumption can be reduced.

At the time of a medium speed operation of the engine, the hydraulic fluid supply passage 39 is connected to the regulators 67 and 68 by a change-over operation of the change-over valve 70 and the hydraulic pressure supply source 41 is connected to the regulator 67 by the changeover valve 69. By these operations, in the first connection changeover means 49a, the first and second drive rocker arms 26 and 28 are connected with each other, whereas the second connection changeover means 49b remains in the connection release condition. Therefore, the first and second drive rocker arms 26 and 28 are connected with each other and the first and second intake valves 12a and 12b are opened and closed at a timing and with an amount of lift determined in accordance with the shape of the low speed cam 22, which assures a sufficient volume of intake passage and increases the torque in the medium speed range.

At the time of a high speed operation of the engine, the hydraulic pressure supply source 41 is connected to the regulator 68 by the changeover valve 69. This causes the changeover pins 54a and 54b to be operated for connection in the first and second connection changeover means 49a and 49b, respectively, and the first drive rocker arm 26, and the second drive rocker arm 28 and the free rocker arm 27 are integrally connected to one another. Thereby both the intake valves 12a and 12b are operated for opening and closing actions in compliance with the shape of the high speed cam 23. Therefore, the charging efficiency in the combustion chamber 5 can be improved, leading to an increase in the revolution and output performances of the engine.

Figure 9:
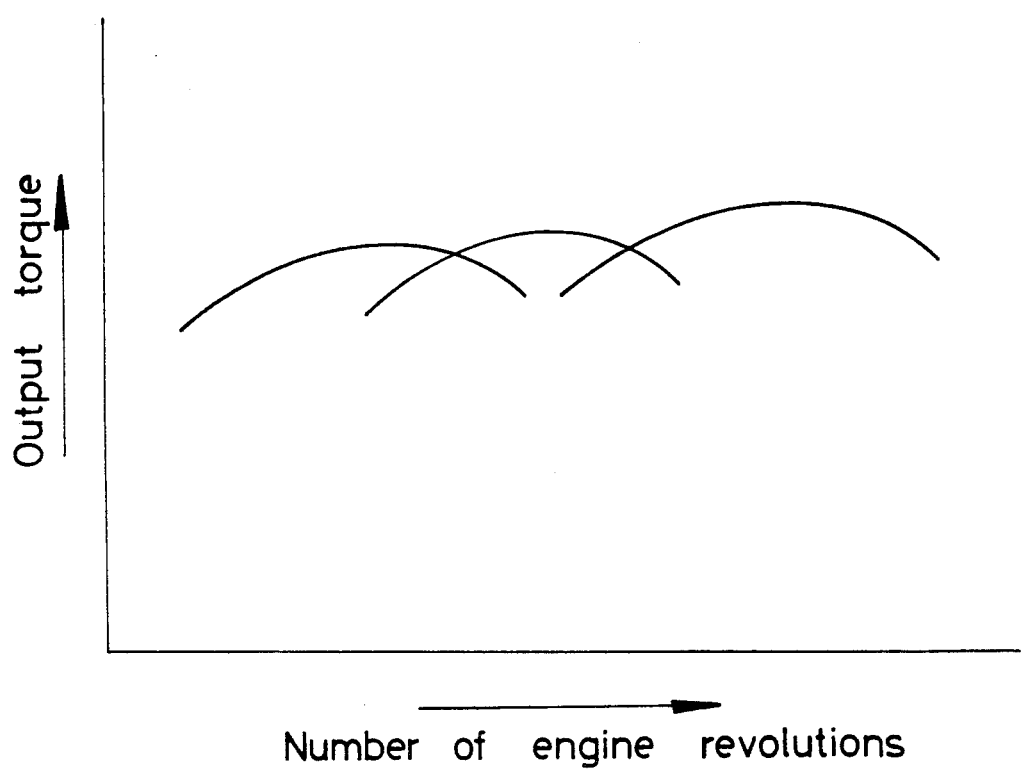

In this manner, by varying the operational modes of the intake valves 12a and 12b corresponding to the low, medium and high speed operations of the engine, the torque can be prevented from falling down while obtaining a peak of the output in each speed operational range, and the level of torque can be uniformalized over a wide operational area, as shown in FIG. 9.

Moreover, since there is nothing present in the swirl producing intake port 8 and the main intake port 9 that may increase the intake resistance, the charging efficiency during the medium and high speed operations of the engine can be improved as compared with conventional arrangements, leading to an increase in the output performance.

Though in the above described embodiments the second intake valve 12b has been arranged to be kept at a substantially resting condition during the low speed operation of the engine, it may be modified that the second intake valve 12b is brought into a completely resting condition.

What is claimed is:

1. An intake system for an internal combustion engine, comprising first and second intake valve openings provided in a body of the engine so as to be exposed to a combustion chamber, first and second intake valves capable of opening and closing said first and second intake valve openings, respectively, and a valve operating device for said first and second intake valves including a plurality of cams and members associated with said cams, respectively, for causing opening and closing of the first and second intake valves, said members being capable of being mutually connected and disconnected, wherein said engine body is provided with a spiral-shaped swirl producing intake port leading to the first intake valve opening and a substantially linear intake port leading to the second intake valve opening, and wherein said valve operating device is capable of changing over a state of operation of the first and second intake valves between a first state in which the first intake valve is operated in a first mode corresponding to a low speed operation of the engine and the second intake valve is in a resting or a substantially resting condition, and a second state in which the first and second intake valves each are operated in a second mode corresponding to a high speed operation of the engine different than said first mode.

2. The intake system of claim 1, wherein in said second mode said first intake valve is opened to permit supply of a larger amount of air-fuel mixture into the combustion chamber through the first intake valve opening than in said first mode.

3. The intake system of claim 1, wherein in said second mode said first intake valve is operated to have at least one of a larger opening angle and a larger amount of lift than in the first mode.

4. The intake system of claim 1, wherein said cams of the valve operating device comprise a first cam, a second cam and a third cam and said members comprise a first member for causing opening and closing of the first intake valve by operation of the first cam in the first state, a second member associated with the second cam and permitting the second intake valve to assume said resting or substantially resting condition in the first state and a third member associated with the third cam and capable of being connected with the first and second members in said second state to drive said first and second intake valves in accordance with operation of the third cam.

5. An intake system for an internal combustion engine, comprising first and second intake valve openings provided in a body of the engine so as to be exposed to a combustion chamber, first and second intake valves capable of opening and closing said first and second intake valve openings, respectively, and a valve operating device for said first and second intake valves including a plurality of cams and members associated with said cams, respectively, for causing opening and closing of the first and second intake valves, said members being capable of being mutually connected and disconnected, wherein said engine body is provided with a spiral-shaped swirl producing intake port leading to the first intake valve opening and a substantially linear intake port leading to the second intake valve opening, and wherein said valve operating device is capable of changing over a state of operation of the first and second intake valves between a first state in which the first intake valve is operated in a first mode corresponding to a low speed operation of the engine and the second intake valve is in a resting or a substantially resting condition, a second state in which both the first and second intake valves are operated in said first mode so as to correspond to a medium speed operation of the engine, and a third state in which the first and second intake valves each are operated in a second mode corresponding to a high speed operation of the engine different than said first mode.

6. The intake system of claim 5, wherein in said second mode said first intake valve is opened to permit supply of a larger amount of air-fuel mixture into the combustion chamber through the first intake valve opening than in said first mode.

7. The intake system of claim 5, wherein in said second mode said first intake valve is operated to have at least one of a larger opening angle and a larger amount of lift than in the first mode.

8. The intake system of claim 5, wherein in said second mode said second intake valve is opened to permit supply of a larger amount of air-fuel mixture into the combustion chamber through the second intake valve opening than in said first mode.

9. The intake system of claim 5, wherein in said second mode said second intake valve is operated to have at least one of a larger opening angle and a larger amount of lift than in the first mode.

10. The intake system of claim 5, wherein said cams of the valve operating device comprise a first cam, a second cam and a third cam and said members comprise a first member or causing opening and closing of the first intake valve by operation of the first cam in the first state, a second member associated with the second cam and permitting the second intake valve to assume said resting or substantially resting condition in the first state and a third member associated with the third cam and capable of being connected with the first and second members in said third state to drive said first and second intake valves in accordance with operation of the third cam, said first and second members being capable of being connected together in said second state to drive said first and second intake valves in accordance with operation of the first cam.

* * * * *